(12) United States Patent
Daniell et al.

(10) Patent No.: US 7,757,003 B2
(45) Date of Patent: Jul. 13, 2010

(54) SERVER-BASED MESSAGE PROTOCOL TRANSLATION

(75) Inventors: William Todd Daniell, Marietta, GA (US); Lee G. Friedman, Alpharetta, GA (US); Larry Graham Kent, Jr., Loganville, GA (US); Joel A. Davis, Marietta, GA (US); Brian Kieth Daigle, Marietta, GA (US)

(73) Assignee: AT&T Intellectual Property II, LP, Reno, NV (US)

( * ) Notice: Subject to any disclaimer, the term of this patent is extended or adjusted under 35 U.S.C. 154(b) by 0 days.

(21) Appl. No.: 12/343,248

(22) Filed: Dec. 23, 2008

(65) Prior Publication Data

US 2009/0132726 A1  May 21, 2009

Related U.S. Application Data

(63) Continuation of application No. 11/305,596, filed on Dec. 16, 2005, now Pat. No. 7,469,301, which is a continuation of application No. 10/274,478, filed on Oct. 18, 2002, now Pat. No. 7,035,942.

(60) Provisional application No. 60/411,336, filed on Sep. 17, 2002, provisional application No. 60/419,613, filed on Oct. 17, 2002.

(51) Int. Cl.
*G06F 15/16* (2006.01)

(52) U.S. Cl. .................. 709/246; 709/202; 709/227

(58) Field of Classification Search ......... 709/202–207, 709/223–231, 217–219, 238, 245, 246, 248; 370/351

See application file for complete search history.

(56) References Cited

U.S. PATENT DOCUMENTS

| | | | | |
|---|---|---|---|---|
| 5,497,373 A | * | 3/1996 | Hulen et al. | 370/259 |
| 6,463,078 B1 | * | 10/2002 | Engstrom et al. | 370/466 |
| 6,535,486 B1 | * | 3/2003 | Naudus et al. | 370/235 |
| 6,549,937 B1 | * | 4/2003 | Auerbach et al. | 709/206 |
| 6,629,163 B1 | * | 9/2003 | Balassanian | 710/33 |
| 6,738,822 B2 | * | 5/2004 | Fukasawa et al. | 709/231 |
| 7,321,969 B2 | * | 1/2008 | Schoen et al. | 713/153 |
| 7,543,034 B2 | * | 6/2009 | Deshpande | 709/207 |
| 2003/0018726 A1 | * | 1/2003 | Low et al. | 709/206 |
| 2003/0054810 A1 | * | 3/2003 | Chen et al. | 455/422 |
| 2003/0189643 A1 | * | 10/2003 | Quintana | 348/207.1 |
| 2003/0204720 A1 | * | 10/2003 | Schoen et al. | 713/153 |
| 2003/0204722 A1 | * | 10/2003 | Schoen et al. | 713/156 |
| 2003/0204741 A1 | * | 10/2003 | Schoen et al. | 713/200 |
| 2003/0236839 A1 | * | 12/2003 | Demsky et al. | 709/205 |

* cited by examiner

*Primary Examiner*—Asad M Nawaz
(74) *Attorney, Agent, or Firm*—Akerman Senterfitt; Michael K. Dixon; Paul F. Neils

(57) ABSTRACT

A system and method are presented in which a plurality of transport protocol objects (TPOs) are instantiated at a server. In one embodiment, each of the plurality of TPOs is adapted to provide a translation between a first IM protocol and a different IM protocol.

16 Claims, 14 Drawing Sheets

FIG. 10

BELLSOUTH IM USER AGENT — 115

BELLSOUTH IM SERVER — 126

BELLSOUTH TPO — 227

IM ABSTRACTION OBJECT — 130

AOL TPO — 220 / 310

AOL SERVER

AOL USER AGENT — 320

532 GENERATE AOL NATIVE QUERY FOR PRESENCE

534 POLL AOL SERVER USING AOL-NATIVE QUERY FOR PRESENCE

536 DETERMINE PRESENCE INFORMATION OF CONTACT

538 RELAY AOL-NATIVE PRESENCE INFORMATION

540 ENCAPSULATE PRESENCE INFORMATION USING XML

542 RELAY XML PRESENCE INFORMATION

544 DETERMINE SESSION USING SESSION ID

546 RELAY XML PRESENCE INFORMATION

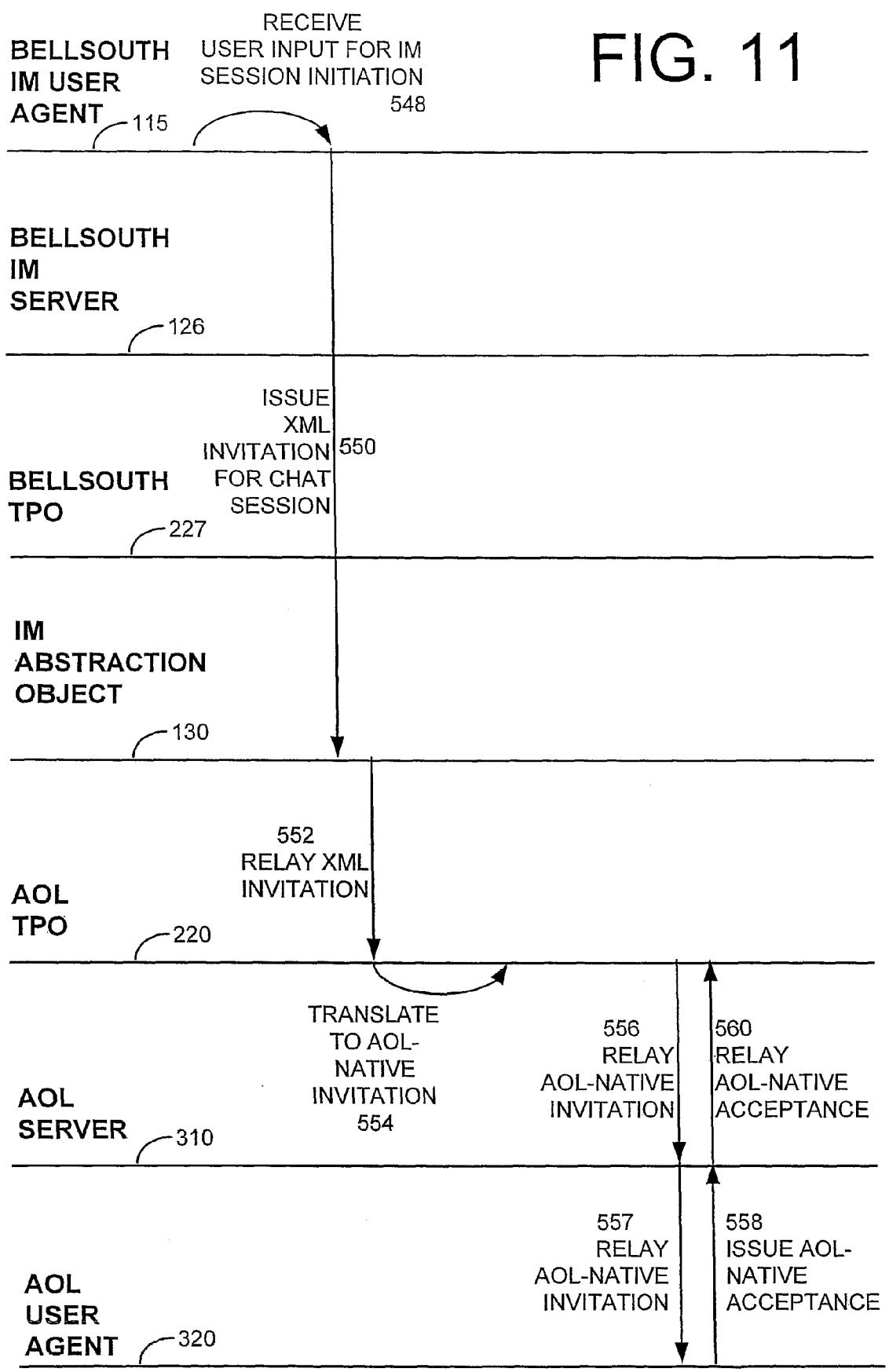

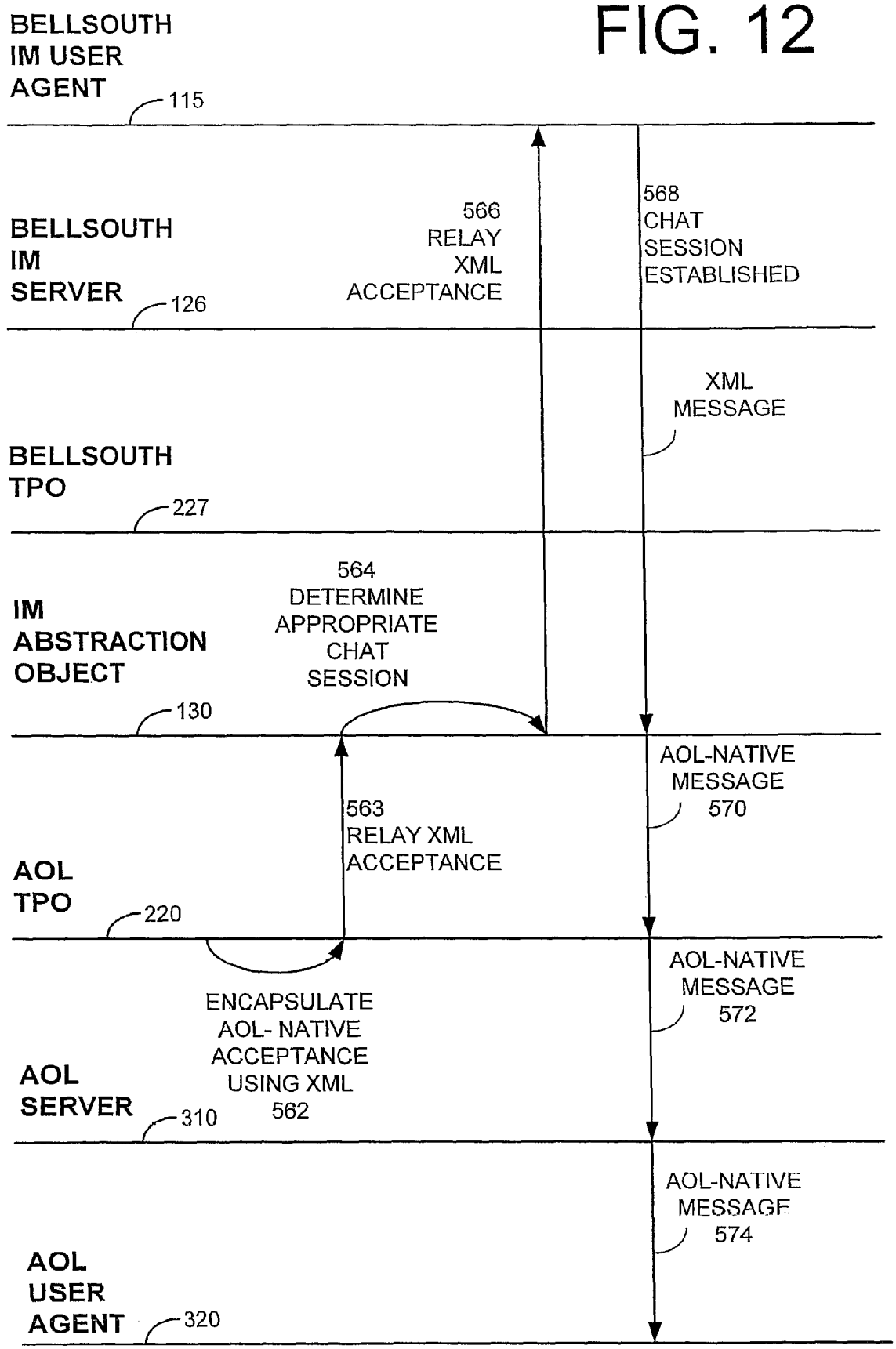

SERVER-BASED MESSAGE PROTOCOL TRANSLATION

CROSS-REFERENCE TO RELATED APPLICATIONS

This application is a is a continuation of copending U.S. utility application Ser. No. 11/305,596, filed Dec. 16, 2005 which is a continuation of U.S. utility application Ser. No. 10/274,478, filed Oct. 18, 2002 and issued Apr. 25, 2006 as U.S. Pat. No. 7,035,942, which claims the benefit of U.S. provisional patent application Ser. No. 60/411,336, filed Sep. 17, 2002 and U.S. provisional patent application Ser. No. 60/419,613, filed Oct. 17, 2002, all of which are incorporated herein by reference in their entirety.

FIELD OF DISCLOSURE

The present disclosure relates generally to the Internet and, more particularly, to systems and methods for providing interoperability between various Internet protocols.

BACKGROUND

In recent years, the Internet community has grown at an astounding rate. Similarly, the number of products directed to the Internet has grown concomitantly with the dramatic growth of the Internet community. Among the products directed to the Internet are email products, instant messaging (IM) products, video conferencing products, voice-over-Internet protocol (VoIP) products, and many more products that employ the Internet as the backbone for their operations.

The rapid expansion of Internet-directed products is generating an accompanying increase in the sophistication of Internet users, which is, in turn, generating a further expansion of products directed to the Internet. This positive-feedback cycle results in various vendors launching their own Internet products using various technologies that are conducive to fast capitalization of such an expanding market. Thus, while many of the products from the various vendors provide largely similar services, the discrepant technologies used by the various vendors produce problems of interoperability between the various products. For example, while vendors such as Microsoft, Yahoo, and America On-Line (AOL) provide relatively similar instant messaging (IM) services, the underlying protocols employed by the various vendors differ vastly. Thus, in order for Microsoft's IM product to communicate with Yahoo's IM product, the underlying protocol must be translated from Microsoft's protocol to Yahoo's protocol. Similarly, in order for Microsoft's IM product to communicate with AOL's IM product, another translation must occur between Microsoft's protocol and AOL's protocol. As one can see, for interoperability between protocols used by the various vendors, a translation must exist for each protocol for which there is desired interoperability.

Thus, in the past, each IM service had a translation protocol for as many other IM services to which it sought to provide interoperability. Unfortunately, since all communications with a particular service was routed from server to server for this type of approach, any failure in the path resulted in loss of all messaging with a particular service. Additionally, a failure in the server often resulted in loss of all services provided by that server. Moreover, because all messages to other services were routed through the server, the server was required to process all of the messages to all of the services, thereby resulting in greater delays in all services.

In view of this incompatibility among the various vendors, the Internet Engineering Task Force (IETF) began soliciting input from the Internet community to address the problems of incompatibility. This resulted in the adoption of several recommendations by the IETF. For example, Request for Comments (RFC) 2778 and RFC 2779 provide guidelines for presence and IM. However, apart from general features associated with IM, RFC 2778 and RFC 2779 provide very little instruction for actually implementing IM by various vendors.

This lack of instruction resulted in further study by members of the IETF, who published several memos and recommendations for Common Presence and Instant Messaging (CPIM). However, the IETF efforts only address a fraction of the problems dealing with interoperability.

Thus, a heretofore-unaddressed need exists in the industry to address the aforementioned deficiencies and inadequacies.

SUMMARY

The present disclosure provides systems and methods for providing interoperability between various Internet protocols.

Briefly described, in architecture, one embodiment of the system comprises a server, and a plurality of transport protocol objects (TPOs) instantiated at the server. In one embodiment, each of the plurality of TPOs is adapted to provide a translation between a first IM protocol and a different IM protocol.

The present disclosure also provides methods for providing interoperability between various Internet protocols. In this regard, one embodiment of the method comprises the steps of instantiating a plurality of transport protocol objects (TPOs) at a server, establishing a plurality of connections between the plurality of TPOs and a plurality of servers, and providing a communication pathway between an IM client and the plurality of servers through the plurality of instantiated TPOs. In one embodiment, each of the plurality of TPOs is adapted to provide a translation between a first IM protocol and a different IM protocol. The IM client transmits and receives IM messages using the first IM protocol, while each of the plurality of servers transmits and receives IM messages using one of the different IM protocols.

Other systems, methods, features, and advantages will be or become apparent to one with skill in the art upon examination of the following drawings and detailed description. It is intended that all such additional systems, methods, features, and advantages be included within this description.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 7 through 12 are data-flow diagrams outlining the relationship of various TPOs with a user agent and a server.

DETAILED DESCRIPTION OF THE PREFERRED EMBODIMENTS

Figure 1A:
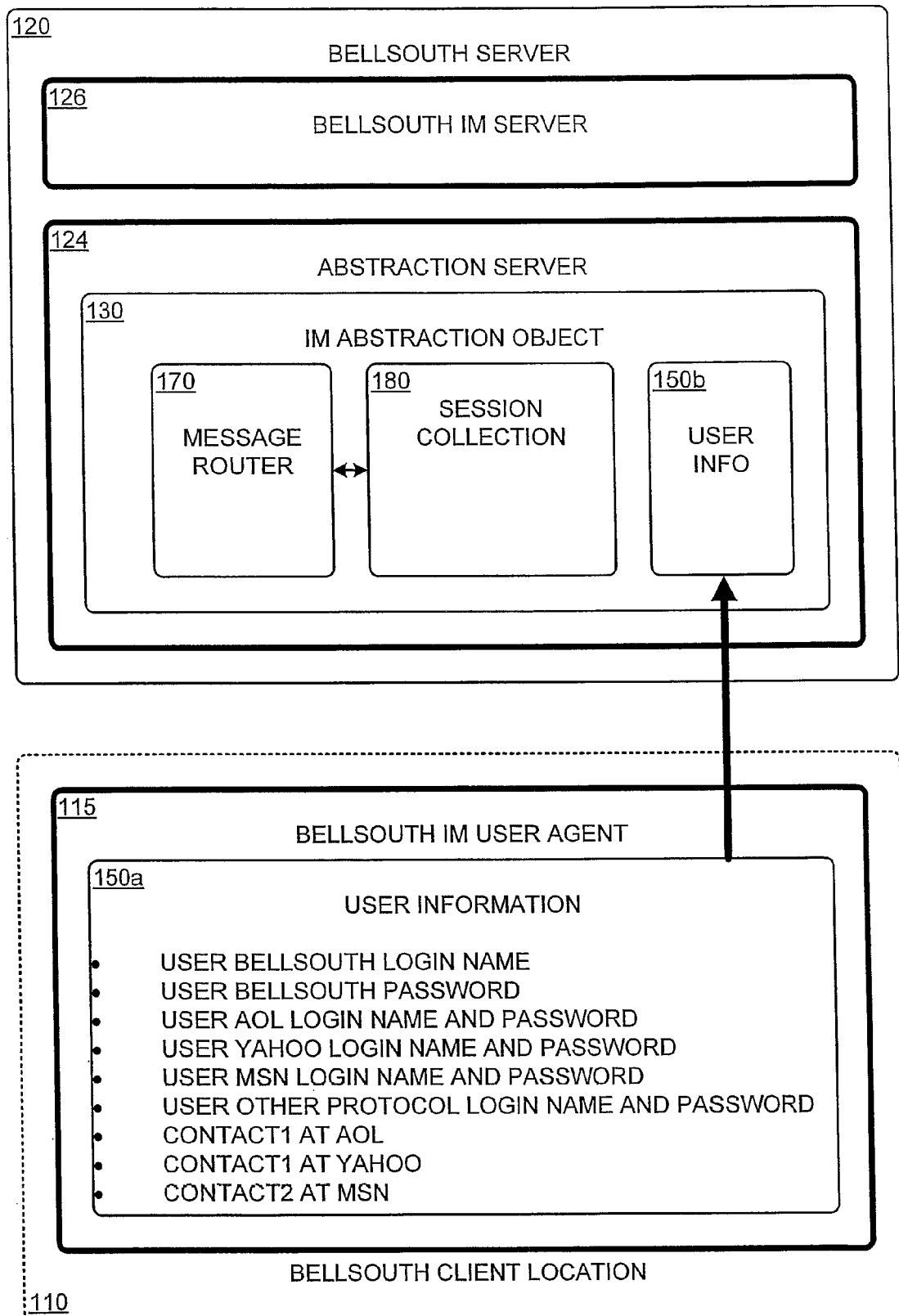
FIG. 1A is a block diagram showing one embodiment of a user agent uploading user information to a server.

Reference is now made in detail to the description of the embodiments as illustrated in the drawings. While several embodiments are described in connection with these drawings, there is no intent to limit the invention to the embodiment or embodiments disclosed herein. On the contrary, the intent is to cover all alternatives, modifications, and equivalents. Additionally, while the interplay between several components are shown in process space for convenience, it will be clear to one of ordinary skill in the art that the components in the process space may correspond to objects that are created during processes at a client computer or a server computer, among others.

FIG. 1A is a block diagram showing an example embodiment of a system having an instant messaging (IM) abstraction object 130. As shown in the non-limiting example of FIG. 1A, a BellSouth IM user agent 115 at a BellSouth client location 110 is in communication with a BellSouth server 120. The BellSouth server 120 may comprise an IM server 126 and an abstraction server 124. The IM server 126 is adapted to handle normal IM functions, while the abstraction server 124 is adapted to handle translations of IM functions from various protocols into XML-structured information. The BellSouth IM user agent 115 may be a software application that assists a user in communicating with contacts via an IM session. In this regard, the BellSouth IM user agent 115 is located at a BellSouth client location 110, which may be a personal computer, a handheld computer, a cellular telephone having IM capabilities, an i-pager, or any network-compatible device.

When a BellSouth IM user (not shown) provides user information 150a at the BellSouth IM user agent 115 (e.g., through one or more conventional input devices in response to one or more data entry screens displayed to the user), the user information 150a is transmitted by the BellSouth IM user agent 115 to the abstraction server 124 through a communication line 160 and other conventional mechanisms. In one example embodiment, among others, the user information is transmitted and stored on the abstraction server 124 as XML-structured information because XML provides a versatile approach that is compatible with almost any other Internet-based technology. In short, ML is a markup language for documents containing structured information, which contains both content (e.g., words, pictures, etc.) and some indication of what role that content plays (e.g., content in a section heading has a different meaning from content in a footnote, which means something different than content in a figure caption or content in a database table, etc.). The XML specification titled "Extensible Markup Language (XML) 1.0 (Second Edition), W3C Recommendation 6 Oct. 2000" (referred to herein as "the XML specification") by W3C is hereby incorporated by reference as if set forth in its entirety.

Figure 1B:
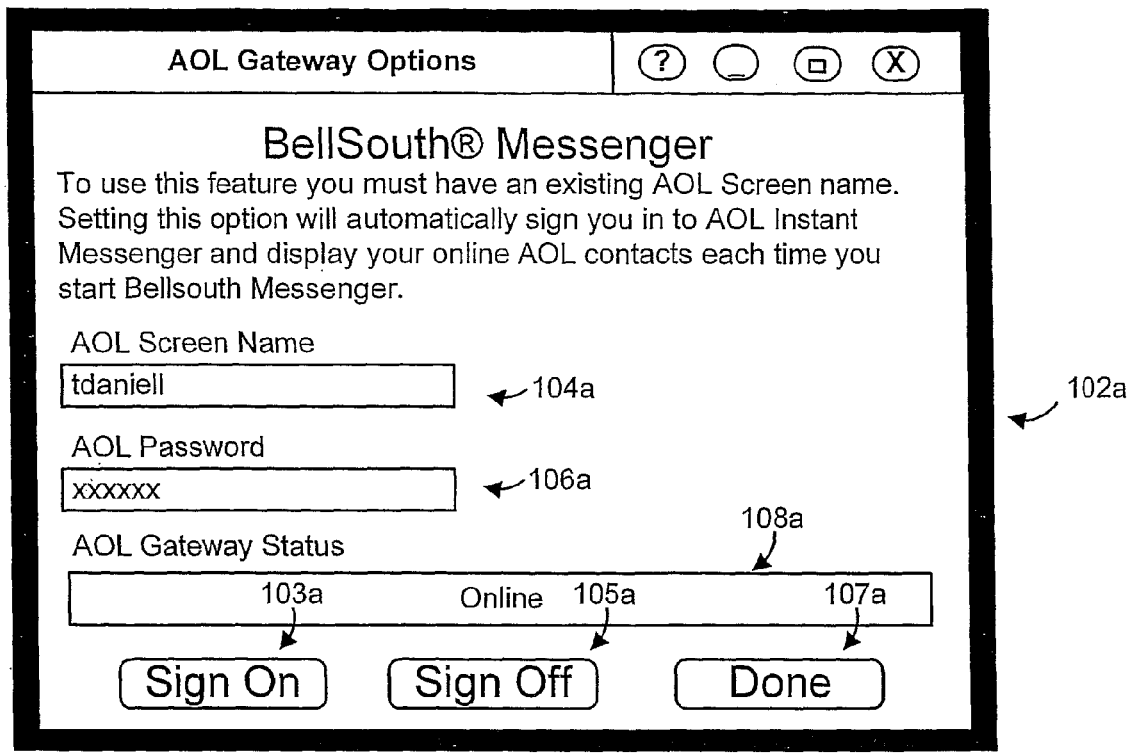
FIGS. 1B and 1C are diagrams showing example user interfaces for providing a login name and a password.

If, for example, a BellSouth user has a BellSouth IM account, an America On-Line (AOL) IM account, a Yahoo IM account, a Microsoft Network (MSN) IM account, or any other IM account, then the BellSouth user may provide an IM login name and password for each of the user's accounts as part of the user information 150a. The inputting of the user information 150a is shown in FIGS. 1B and 1 C. Thus, it should be clear that in at least one example embodiment, a mechanism may be provided for a user to create an account with other message services.

Figure 1C:
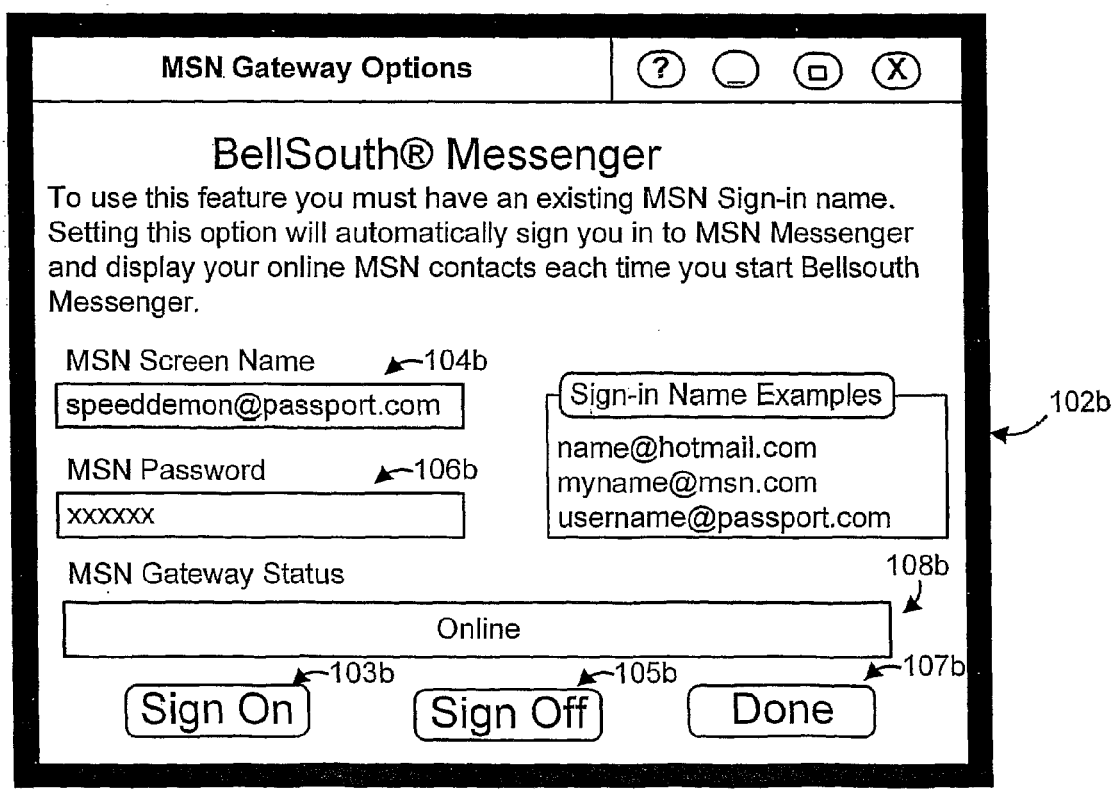

FIGS. 1B and 1C show two embodiments of user interfaces 102a, 102b for inputting login names and passwords at the BellSouth IM user agent 115. Prior to being presented the user interfaces 102a, 102b, a BellSouth IM user preferably enters a BellSouth login name (e.g., username) and password. FIG. 1B shows a user interface 102a for signing onto a BellSouth IM user's AOL account. As shown in FIG. 1B, the AOL user interface 102a provides an input box 104a adapted to receive the AOL login name (or screen name) of the BellSouth IM user. Similarly, the AOL user interface 102a provides an input box 106a adapted to receive the AOL password associated with the AOL login name. Upon entering the AOL login name and the AOL password, the AOL user interface provides a status indication 108a to the BellSouth IM user. The status indication 108a indicates whether or not the BellSouth IM user is online at AOL. The status indication 108a will only indicate that the user is online if the user has selected the sign-on option at some point. Additionally, the AOL user interface provides sign-on 103a and sign-off 103b options to the BellSouth IM user so that the BellSouth IM user can manually initiate and terminate a login to the AOL server.

FIG. 1C shows a user interface 102b for signing onto a BellSouth IM user's MSN account. Similar to the AOL user interface, the MSN user interface 102b provides an input box 104b adapted to receive the MSN login name of the BellSouth IM user. Also, the MSN user interface provides 102b an input box 106b adapted to receive the MSN password associated with the MSN login name. Upon entering the MSN login name and the MSN password, the MSN user interface provides a status indication 108b to the BellSouth IM user. The status indication 108b indicates whether or not the BellSouth IM user is online at MSN. Additionally, the MSN user interface provides sign-on 103b and sign-off 105b options to the BellSouth IM user so that the BellSouth IM user can manually initiate and terminate a login to the MSN server. Furthermore, since multiple MSN IM accounts may exist at different domains, the MSN user interface provides examples 109 of sign-in names.

Figure 2:
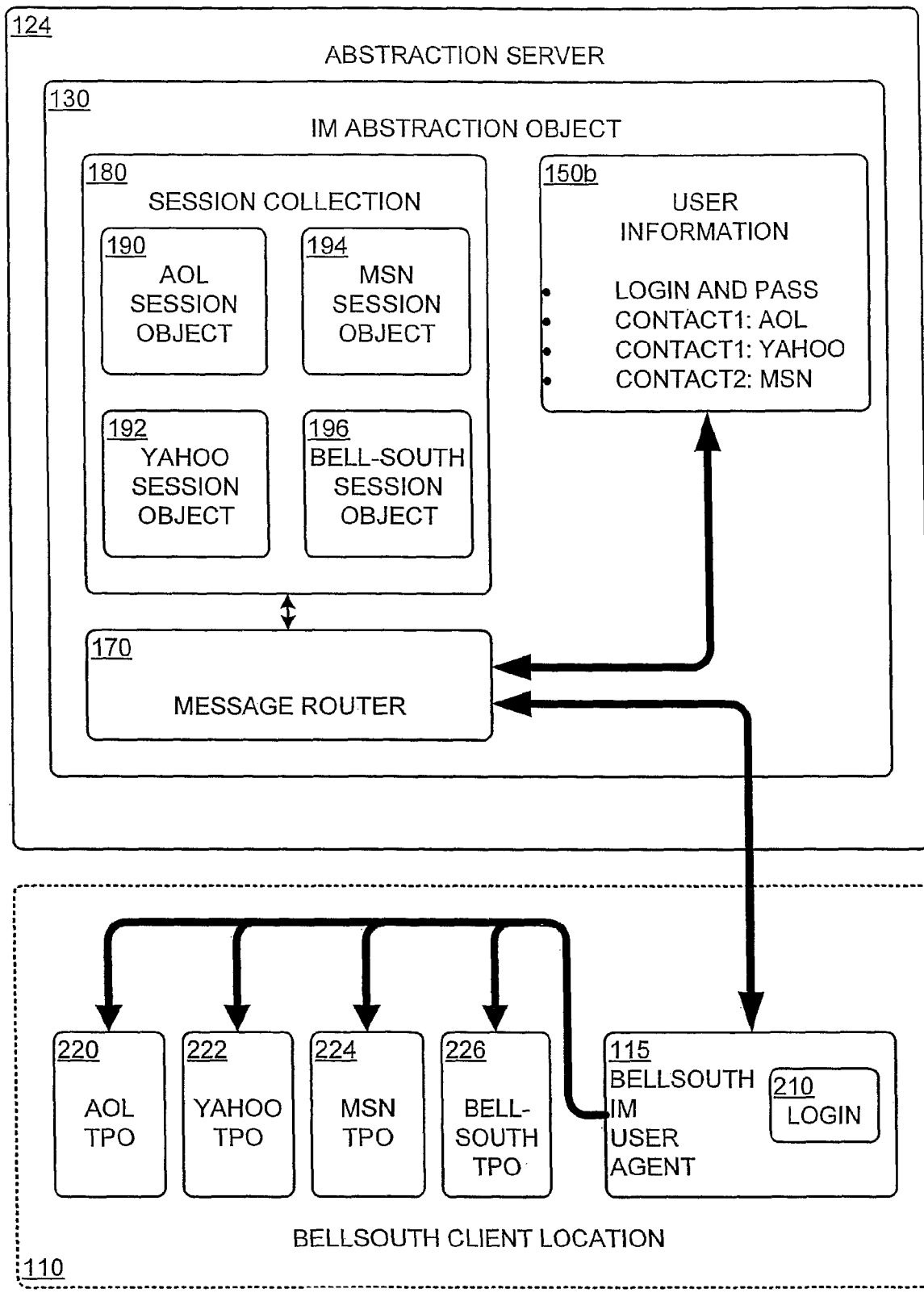
FIG. 2 is a block diagram showing one embodiment of a user agent instantiating a plurality of transport protocol objects (TPOs) at a client.

As shown in an example embodiment in FIG. 2, after a setup process, which itself may launch a login process, the BellSouth user inputs a user BellSouth login name and a BellSouth password at a user interface (not shown) located at the BellSouth IM user agent 115. This information is conveyed to an IM abstraction object 130 located on the abstraction server 124. The IM abstraction object 130 accesses the user information 150b to retrieve login names and passwords for each of the IM accounts of the BellSouth IM user. In some embodiments, the BellSouth login username and password may be different from a username and password for a native BellSouth IM session. Upon retrieving this information, the IM abstraction object 130 generates a request to the BellSouth IM user agent 115. The request includes information for instantiating a variety of TPOs. Thus, upon receiving the request, the BellSouth IM user agent 115 instantiates a BellSouth transport protocol object (TPO) 226, an AOL TPO 220, a Yahoo TPO 222, and an MSN TPO 224 at the BellSouth client location 110. Thus, as shown in FIG. 2, by providing a single BellSouth IM user login and password, multiple TPOs are instantiated because the information needed to instantiate the various TPOs is already stored at the IM abstraction object 130. Other embodiments include transport mechanisms launched or activated in other manners.

Since the TPOs 220, 222, 224, 226 are instantiated at the client location 110, in accordance with one example embodiment, the translation from XML to the BellSouth protocol, the translation from XML to the AOL protocol, the translation from XML to the Yahoo protocol, and the translation from XML to the MSN protocol each occurs at the client location, thereby relinquishing resources of the abstraction server 124 for other functions.

Figure 3:
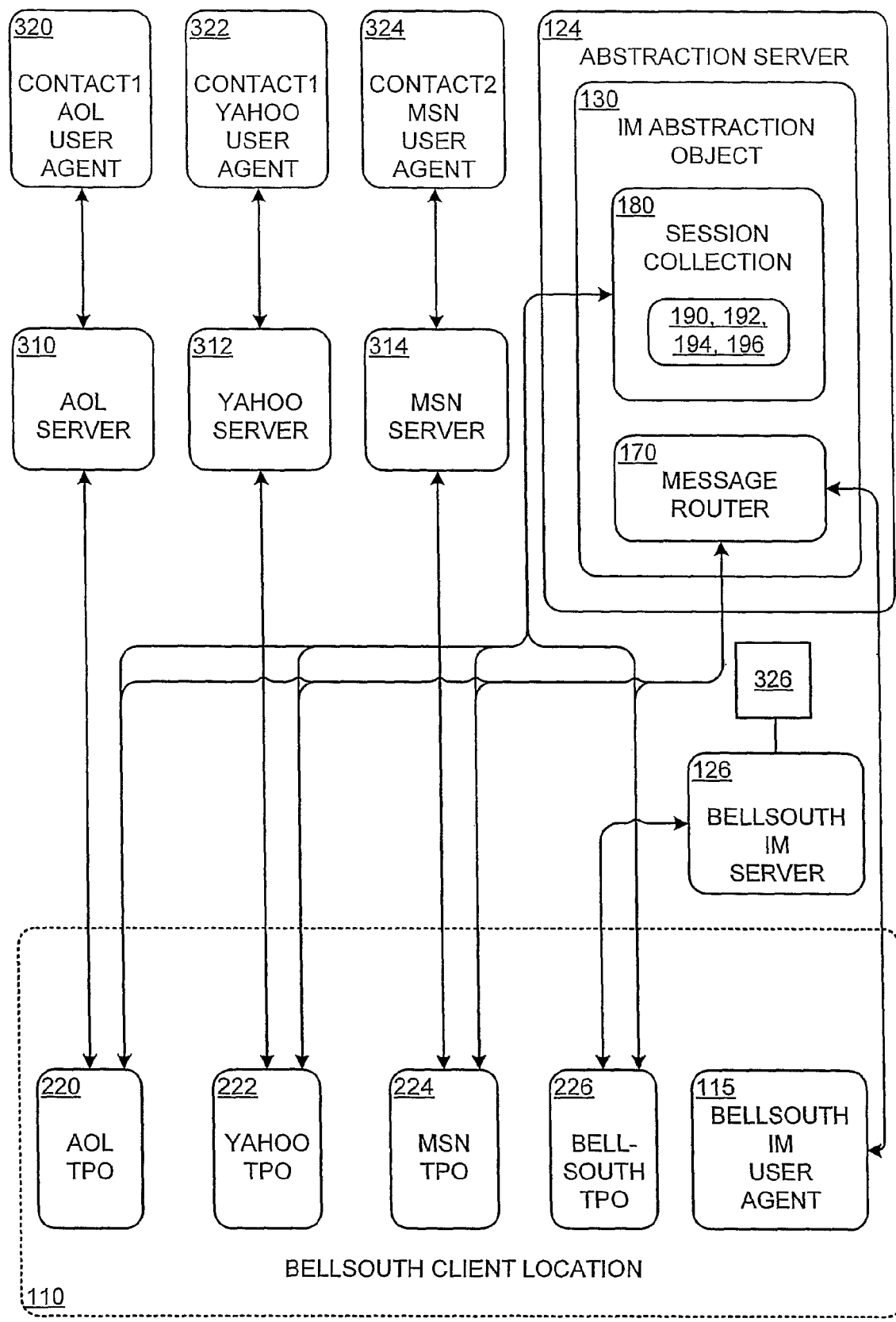
FIG. 3 is a block diagram showing one embodiment of a user agent communicating with a plurality of servers through the plurality of TPOs at the client.

FIG. 3 is a block diagram showing one embodiment in which instantiated TPOs 220, 222, 224, 226 log on to their respective IM servers 310, 312, 314, 126 to provide interoperability between the various protocols. Upon being instantiated, each of the TPOs 220, 222, 224, 226 communicates with its respective server 310, 312, 314 to establish a session, and upon receiving tokens or other session identifiers from its respective server 310, 312, 314, 126, each TPO 220, 222, 224 generates a session identifier (ID). The session ID and the session information are conveyed back to the message router 170. It is worthwhile to note that the TPOs 220, 222, 224, 226 communicate with the various servers 310, 312, 314, 126 in the native protocol of the various servers. Thus, for example, the AOL TPO 220 communicates with the AOL server 310 using an AOL-native protocol; the Yahoo TPO 222 communicates with the Yahoo server 312 using the Yahoo-native protocol, etc. In this regard, each of the TPOs 220, 222, 224, 226 appears as a native client to each of the servers 310, 312, 314, 126. In other words, the MSN TPO 224 appears as an MSN client to the MSN server 314; the AOL TPO 220 appears as an AOL client to the AOL server 310, etc. Thus, none of the servers 310, 312, 314, 126 modify their respective IM protocols or IM interfaces because the servers 310, 312, 314, 126 are in communication with objects that behave as virtual native clients to those servers 310, 312, 314, 126.

The message router 170 stores the session information as shared session objects 190, 192, 194, 196 in the session collection 180. Thus, the AOL TPO 220 generates an AOL session ID, which is conveyed to the message router 170 for storage in the AOL session object 190. Similarly, the Yahoo TPO 222, the MSN TPO 224, and the BellSouth TPO 226 each generates a Yahoo session ID, an MSN session ID, and a BellSouth session ID, respectively. The session IDs are conveyed to the message router 170, which stores the Yahoo session ID in the Yahoo session object 192, the MSN session ID in the MSN session object 194, and the BellSouth session ID in the BellSouth session object 196.

Figure 4A:
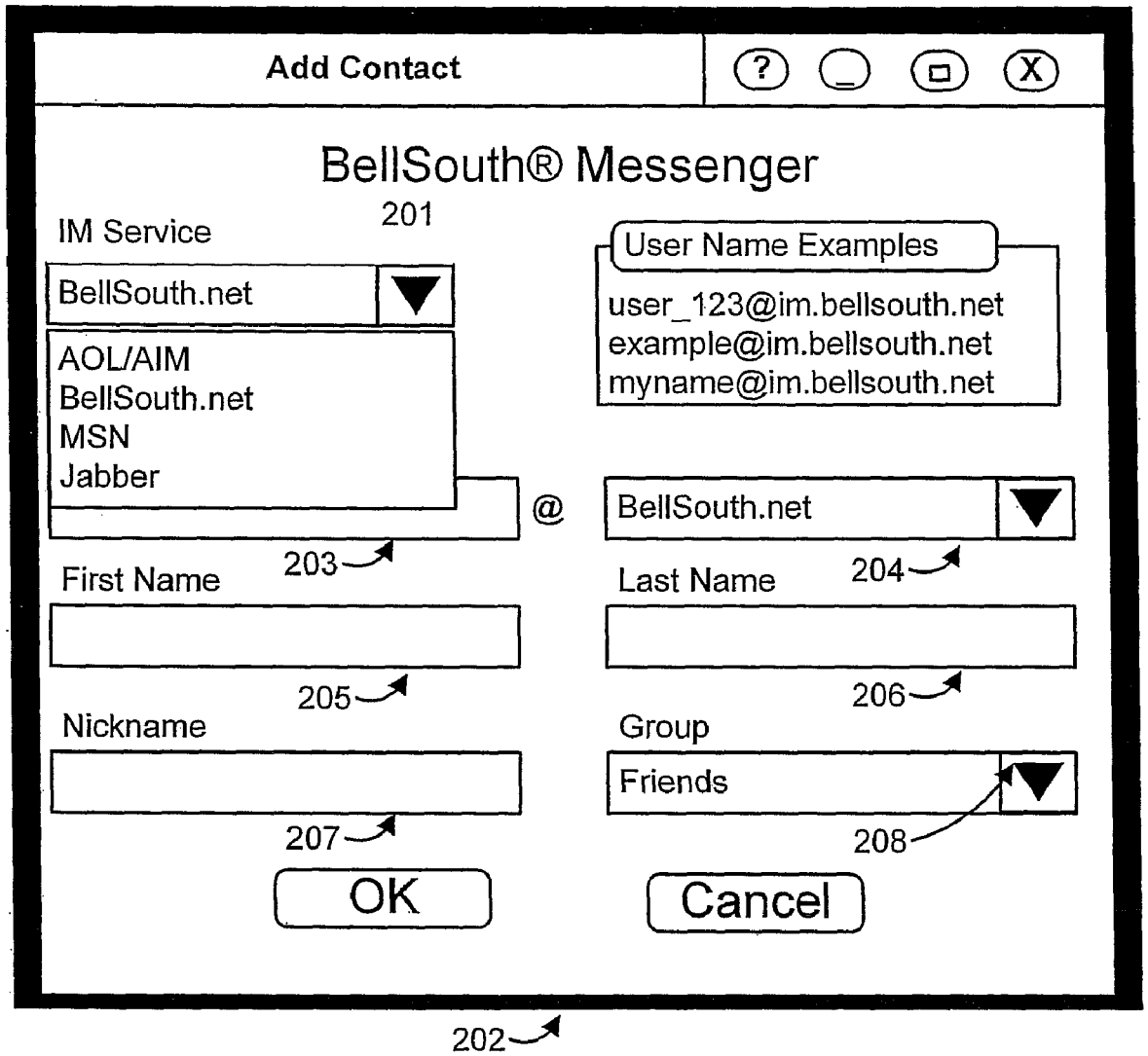
FIG. 4A is a diagram showing an example user interface for providing contact information.

Typically, after the BellSouth user at the BellSouth IM user agent 115 has been logged onto the various servers 310, 312, 314, 126 and the logon information has been stored as the respective session objects 190, 192, 194, 196 using its respective session IDs, an add-contact user interface is provided to the BellSouth IM user. An example add-contact user interface 202 is shown in FIG. 4A. As shown in FIG. 4A, the add-contact user interface 202 may comprise a drop-down menu 201 that includes descriptions for each of the BellSouth IM user's IM accounts. Thus, the BellSouth IM user may add contacts from any account for which the BellSouth IM user also has an account. For example, if the BellSouth IM user wishes to add an AOL contact, then the BellSouth IM user would select the AOL IM service option on the drop-down menu 201. The add-contact user interface further comprises input boxes 203, 205, 206, 207 for the contact's IM logon name, the contact's first name, the contact's last name, and the contact's nickname. Thus, upon selecting the AOL IM service option on the drop-down menu 201, the BellSouth IM user may enter one or more information fields related to the contact. Additionally, the add-contact user interface 202 comprises another drop-down menu 208 that permits the BellSouth IM user to select a group in which to categorize the contact. As a default, the AOL contact would be categorized in an AOL-contacts group.

Similarly, if the BellSouth IM user wishes to add an MSN contact, a BellSouth contact, or a Yahoo contact, then options similar to the AOL contact would be available for the MSN contact, the BellSouth contact, and the Yahoo contact. Once the contact information has been entered, the contact information is stored on its respective server. Thus, if an AOL contact is added, then the AOL contact information would be stored on the BellSouth IM user's AOL account since the AOL TPO 220 is providing an interface to the BellSouth IM user's AOL account. Similarly, if a Yahoo contact is added, then the Yahoo contact information would be stored on the Yahoo server at the user's Yahoo account. Likewise, addition of a BellSouth contact and an MSN contact would update the BellSouth IM user's accounts on the BellSouth server and the MSN server, respectively. Once the contact information has been entered and stored on the respective servers, the contact information will be available to the BellSouth IM user for any subsequent IM session, including from the BellSouth IM user agent 115 at the BellSouth client location 110 and other locations. Additionally, the contact information, once it has been entered and stored, will also be available from other native clients at that native-client location and other locations.

In another embodiment, the BellSouth IM user would be able to access pre-existing contact information that is already stored on the various servers 310, 312, 314. Thus, rather than adding new contacts, when the various TPOs 220, 222, 224 establish a connection to their respective servers 310, 312, 314, the contact information from the servers 310, 312, 314 will be displayed to the BellSouth IM user at the user interface. One example of this is shown in FIG. 4B.

Figure 4B:
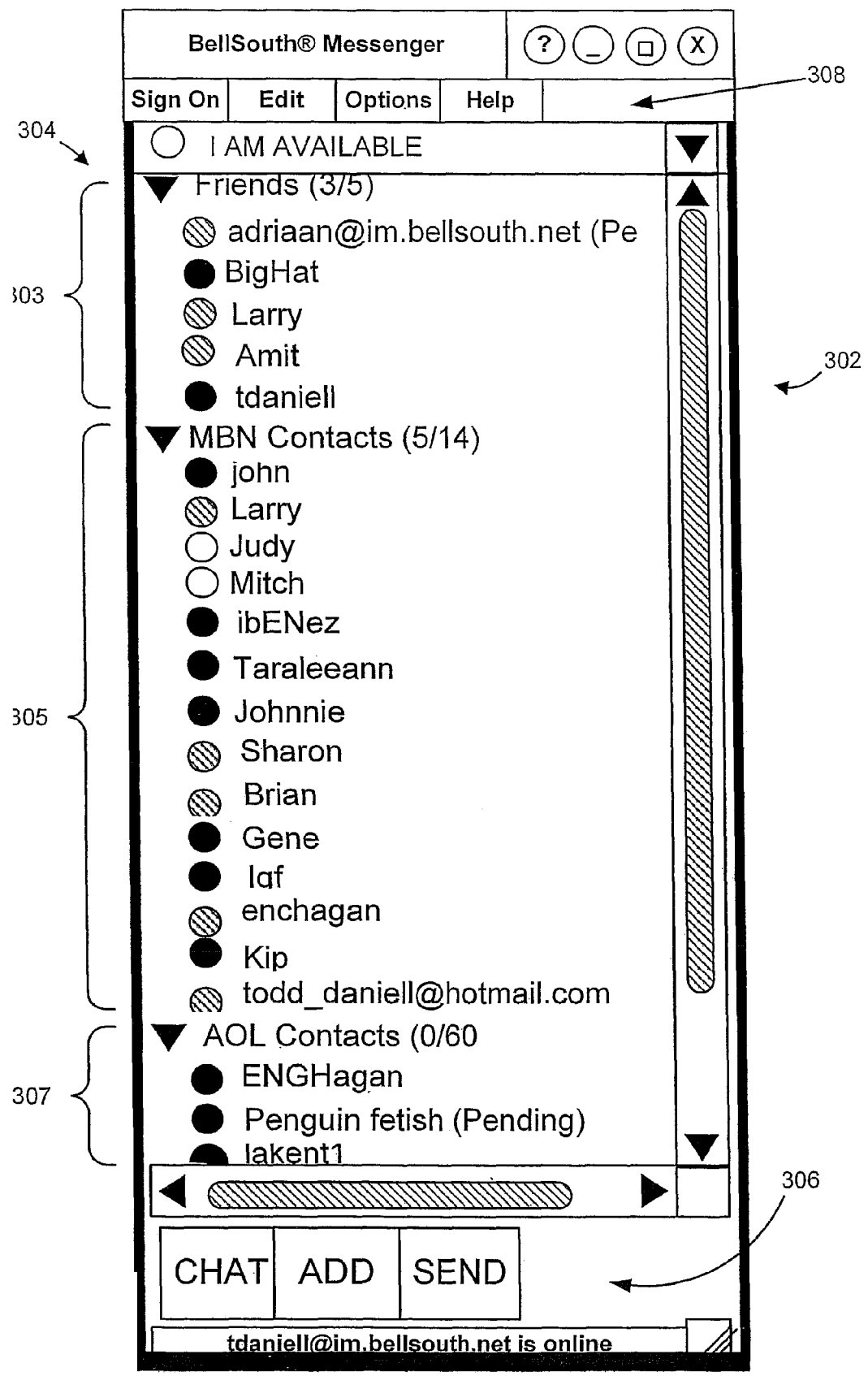
FIG. 4B is a diagram showing an example user interface showing contact information.

FIG. 4B shows an example contact list 302. As shown in FIG. 4B, the various contacts are automatically grouped together by their respective TPOs 303, 305, 307. Thus, all MSN contacts 305 are grouped together, all AOL 307 contacts are grouped together, etc. It will be clear, however, that the groupings may be changed by the BellSouth IM user according to the BellSouth IM user's preference. Also, for each of the contacts, an indication 304 appears beside the contact's name, which indicates the presence status of the contact. These indications 304, in a preferred embodiment are shown in different colors to easily differentiate differences in presence information (e.g., not present, present, busy, etc.). Thus, for example, the indication 304 for available contacts (e.g., Larry, Amit, Sharon, etc.) may be shown in green (shown in FIG. 4B as hashed circles), the indication 304 for unavailable contacts (e.g., BigHat, Johnnie, Gene, etc.) may be shown in grey (shown in FIG. 4B as clear circles), and the indication 304 for busy contacts (e.g., Judy, Mitch, etc.) may be shown in red (shown in FIG. 4B as filled circles).

In addition to the available contacts, the contact list 302 includes user options 306, which permit the user to chat with a contact, add a new contact, or send a message or file to a contact, all of which would initiate another interface area (e.g., window, screen, etc. (not shown)) for the user to accomplish those functions, as would be understood by one of ordinary skill in the art. The user interface also provides the user with additional menus 308, such as an edit menu, an options menu, a sign-on menu, and a help screen. Since, as described above, the various TPOs 220, 222, 224, 226 provide a virtual native client to the various servers 310, 312, 314, 126, a single user interface may aggregate all of the contact information from all of the servers 310, 312, 314, 126 and display them to the user on a single screen. The display of all contacts on all servers 310, 312, 314, 316 on a single screen permits the user to consolidate all of the contacts in a single user interface, thereby simplifying user IM interactions.

After a user logs onto IM sessions through the various TPOs 220, 222, 224, 226, presence information related to the contacts is further determined by the various TPOs 220, 222, 224, 226. This is shown with reference to FIG. 3. Thus, for example, if the BellSouth IM user has added CONTACT1 having an AOL IM address and a Yahoo IM address, and CONTACT 2 having only an MSN account, then presence information of CONTACT1 is determined from the AOL server 310 and the Yahoo server 312, and presence information of CONTACT2 is determined from the MSN server 314. While the polling for presence is shown as being initiated by the TPOs 220, 222, 224, 226, the evaluation of the various servers for presence information may also be initiated by the server or the client. Alternatively, the presence information may be continually refreshed to the various TPOs 220, 222, 224, 226 by the servers 310, 312, 314, 126 without the polling of the servers for the presence information.

In operation, the AOL TPO 220 may generate an AOL-native presence query to determine whether or not CONTACT1 is present. The AOL server 310 is polled using the AOL-native presence query. The AOL server 310 receives the query and generates AOL-native presence information, which indicates whether or not CONTACT1 is present. The AOL-native presence information is relayed to the AOL TPO 220. As with other native information coming down to any TPO, the AOL TPO 220 encapsulates the AOL-native presence information to generate XML-structured presence information having an appropriate session ID. The XML-structured presence information is relayed to the message router 170 by the AOL TPO 220. The message router 170 receives the XML-structured presence information from the AOL TPO 220, and correlates the XML-structured presence information to the established session using session object 190. Using the AOL session object 190 identified by the session ID from the AOL TPO 220, the message router 170 relays the XML-structured presence information to the BellSouth IM user agent 115.

The presence information of CONTACT1 from the Yahoo server 312 and the presence information of CONTACT2 from the MSN server 314 are each determined in a similar fashion. Thus, as seen from FIG. 3, upon logging into each of the servers 310, 312, 314, 126, the respective TPOs 220, 222, 224, 226 determine the presence of the respective contacts. The presence information for each of the contacts is ultimately relayed back to the BellSouth user at the BellSouth IM user agent 115. In other words, the BellSouth IM user now has presence information on each of the contacts on the various servers 310, 312, 314, 126.

At this point, if CONTACT1 is present on AOL, and if the BellSouth user wishes to engage in an IM chat session with CONTACT1 through the AOL server 310, then the BellSouth user initiates an IM chat session with CONTACT1 from the BellSouth IM user agent 115. The BellSouth IM user agent 115 issues an L-structured invitation to the message router 170. The message router 170 receives the XML-structured invitation and conveys the XML-structured invitation to the AOL TPO 220. The AOL TPO 220 receives the XML-structured invitation and generates a thread ID, which is used, in one form or another, to track the thread from the BellSouth IM user agent 115 and the AOL IM agent 320. In addition to generating the thread ID, the AOL TPO 220 translates the XML-structured invitation into an AOL-native invitation. The AOL TPO 220 issues the AOL-native invitation to the AOL server 310, which relays the AOL-native invitation to CONTACT1 at an AOL user agent 320 at an AOL client location. Since the AOL TPO 220 provides the AOL server 310 with AOL-native information related to the thread ID, each invitation may be properly delivered to CONTACT1 at the AOL user agent 320.

If CONTACT1 at the AOL user agent 320 accepts the invitation, then the AOL user agent 320 issues an AOL-native acceptance, which is relayed to the AOL server 310. The AOL server 310 further conveys the AOL-native acceptance to the AOL TPO 220. The AOL TPO 220 receives the AOL-native acceptance and encapsulates the AOL-native acceptance to produce an XML-structured acceptance. The XML-structured acceptance is relayed to the message router 170 by the AOL TPO 220. Since the XML-structured acceptance includes information related to the thread ID for that particular IM session, the message router 170 relays the XML-structured acceptance to the proper BellSouth IM user agent 115. Upon receiving the BellSouth-native acceptance, a chat session is established between the BellSouth IM user and CONTACT1.

During the chat session, the BellSouth user agent 115 generates an XML-structured message. The BellSouth TPO 226 conveys the XML-structured message to the message router 170, which subsequently routes the XML-structured message to the AOL TPO 220 based on the message ID. The AOL TPO 220 translates the XML-structured message into an AOL-native message, and conveys the AOL-native message to the AOL server 310. In addition to routing the XML-structured message, the message router 170 may further modify the message by, for example, adding additional XML tags or tracking information, encrypting all or sensitive portions of the message, etc. The AOL server 310 receives the AOL-native message from the TPO 220 and relays the AOL-native message to CONTACT1 at the AOL user agent 320.

Similarly, the AOL user agent 320 generates an AOL-native message. Of course the representative native user agents 320, 322, 324 could also be replaced in part by a plurality of IM user agents similar to the BellSouth IM user agent 115 having the various TPOs 220, 222, 224, 226. The AOL-native message has a message ID, or equivalent, to track the message. The AOL-native message is conveyed to the AOL IM server 310, which further conveys the AOL-native message to the AOL TPO 220. The AOL TPO 220 encapsulates the AOL-native message to produce an XML-structured message. In addition to producing the XML-structured message, the AOL TPO 220 may further modify the message by, for example, altering the header of the message. The AOL TPO 220 conveys the XML-structured message to the message router 170, which subsequently routes the XML-structured message to the BellSouth IM user at the BellSouth IM user agent 115.

Similar to the chat session with the AOL user agent 320, the BellSouth IM user agent 115 may engage in a chat session with the Yahoo user agent 322 and the MSN user agent 324 through the Yahoo TPO 222 and the MSN TPO 224, respectively. While this process is not specifically described here, it will be clear to one of ordinary skill in the art that the Yahoo TPO 222, the MSN TPO 224, the BellSouth TPO 226, or any other TPO (not shown) performs similar functions to the AOL TPO 220. In other words, the various TPOs 222, 224, 226 each perform similarly as the AOL TPO 220 to translate between various native protocols and XML.

As seen in the embodiments of FIGS. 2 and 3, the various TPOs 220, 222, 224 located at the BellSouth client location 110 provide for translation between various non-universal protocols and a single universal protocol, such as XML. Additionally, by having the TPOs 220, 222, 224, 226 located at a client rather than a server, resources of the server are not consumed by translating the various protocols into XML. Thus, server bottlenecks associated with server processing are concomitantly reduced by having the TPOs 220, 222, 224 at the client location. Additionally, server firewall problems may be ameliorated by having the TPOs 220, 222, 224, 226 at the client location.

Figure 5:
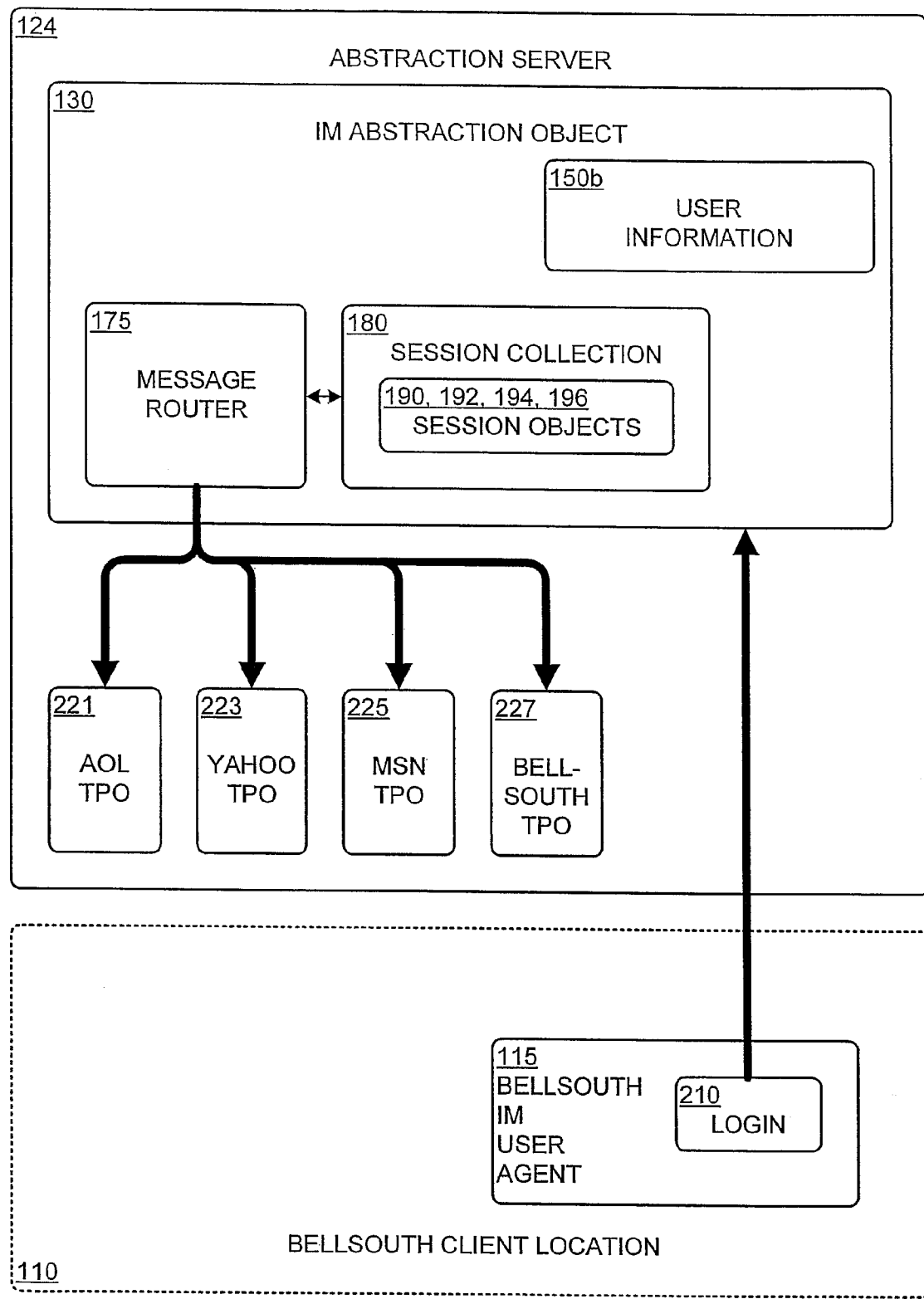
FIG. 5 is a block diagram showing another embodiment of a user agent instantiating a plurality of transport protocol objects (TPOs) at a server.
Figure 6:
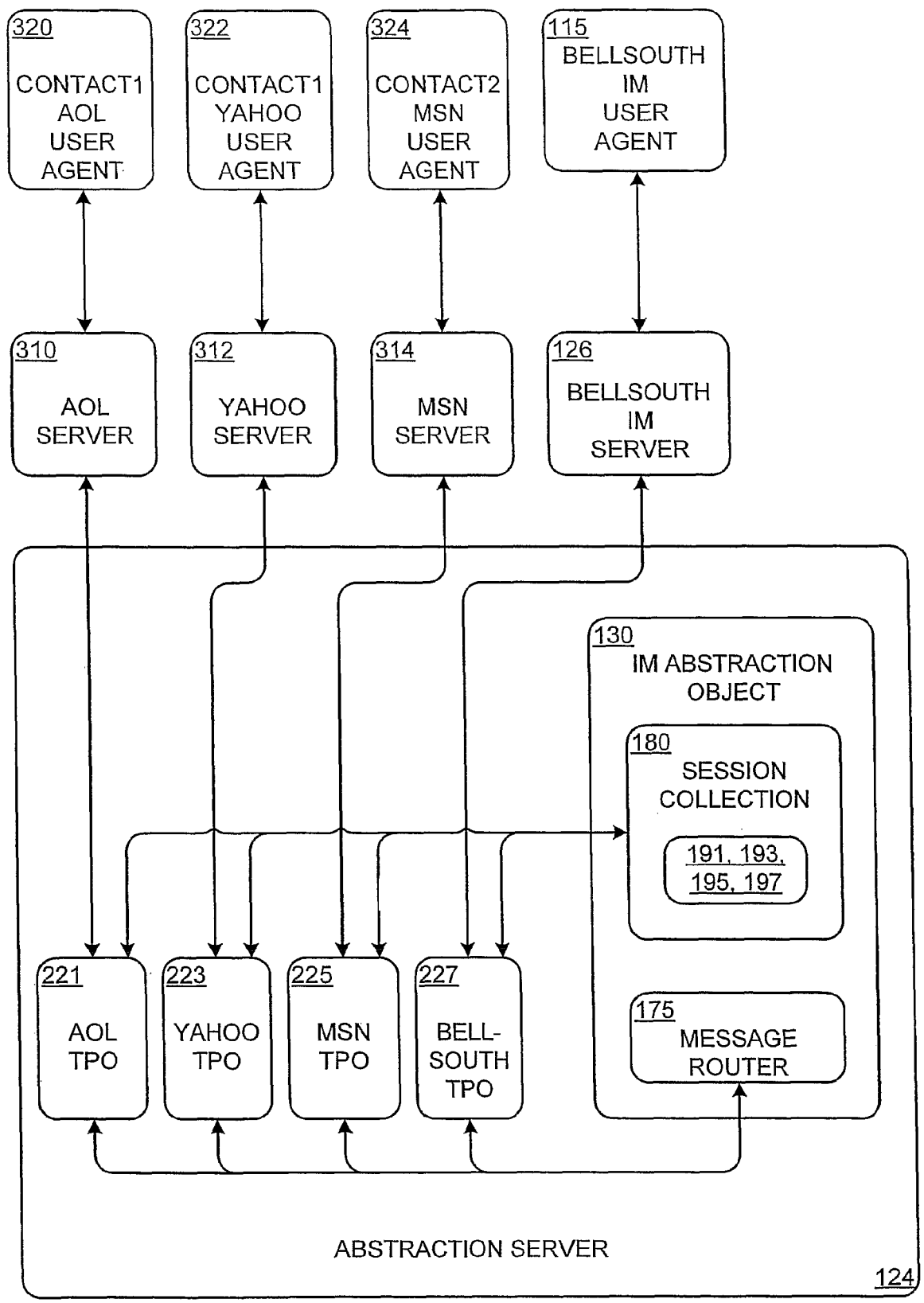
FIG. 6 is a block diagram showing another embodiment of a user agent communicating with a plurality of servers through the plurality of TPOs at the server.

FIGS. 5 and 6 show another embodiment of a system, wherein the TPOs 221, 223, 225, 227 are located at the abstraction server 124. By having the TPOs 221, 223, 225 at the abstraction server 124, rather than at a client location, a single TPO may be used by multiple IM users, thereby reducing the number of instantiated TPOs.

As shown in an example embodiment in FIG. 5, the BellSouth user inputs a user BellSouth login name and a BellSouth password at a user interface (not shown) located at the BellSouth IM user agent 115. This information is conveyed to an IM abstraction object 130 located on the abstraction server 124. A message router 175 in the IM abstraction object 130 instantiates a BellSouth TPO 227, an AOL TPO 221, a Yahoo TPO 223, and an MSN TPO 225 at the abstraction server 124. Similar to the embodiment of FIG. 2, by inputting a single user name and password, multiple TPOs (or sessions within existing TPOs) are generated because the necessary information is stored at the abstraction server.

Since the TPOs 221, 223, 225, 227 are instantiated at the abstraction server 124, a single TPO can accommodate multiple users from a particular protocol. For example, a single AOL TPO 221 can accommodate multiple AOL users; a single MSN TPO 225 can accommodate multiple MSN users, etc. This reduces the number of TPOs instantiated, thereby reducing some of the processing by the server. Since multiple users can access the same TPO, the TPO generates a separate session ID for each of the multiple users.

The abstraction server 124 stores user information 150*b*, such as the various login names and passwords, as well as the various session objects 191, 193, 195, 197 associated with a particular BellSouth IM user. Thus, when a BellSouth IM user subsequently logs on at a BellSouth IM user agent 115, the logon information is conveyed to the message router 175 at the abstraction server 124, which retrieves the user information 150*b*. Upon retrieving the user information 150*b* and the information related to the various TPOs 221, 223, 225, 227, the message router 175 automatically instantiates the BellSouth TPO 227, the AOL TPO 221, the Yahoo TPO 223, and the MSN TPO 225, or utilizes respective existing TPOs.

FIG. 6 is a block diagram showing one embodiment in which instantiated TPOs 221, 223, 225, 227 logon to their respective IM servers 310, 312, 314, 126 to provide interoperability between the various protocols. Once the BellSouth user at the BellSouth IM user agent 115 has been logged onto the various servers 310, 312, 314, 126 and the logon information has been stored as the respective session objects 191, 193, 195, 197 using its respective session IDs, an add-contact user interface is often accessed by the BellSouth IM user. Since an add-contact user interface has been described above, further discussion of the add-contact user interface is omitted here.

If the BellSouth IM user wishes to add an MSN contact, a BellSouth contact, or a Yahoo contact, then options similar to the AOL contact would be available for the MSN contact, the BellSouth contact, and the Yahoo contact. Once the contact information has been entered, the contact information is stored on its respective server. Thus, if an AOL contact is added, then the AOL contact information would be stored on the BellSouth IM user's AOL account since the AOL TPO 221 is providing an interface to the BellSouth IM user's AOL account. Similarly, if a Yahoo contact is added, then the Yahoo contact information would be stored on the BellSouth IM user's Yahoo account since the Yahoo TPO 223 is providing an interface to the BellSouth IM user's Yahoo account. Likewise, addition of a BellSouth contact and an MSN contact would update the BellSouth IM user's account on the BellSouth server and the MSN server respectively. Once the contact information has been entered and stored on the respective servers, the contact information will be available to the BellSouth IM user for any subsequent IM session.

Upon logging onto subsequent IM sessions through the various TPOs 221, 223, 225, 227, presence information related to the contacts is further determined by the various TPOs 221, 223, 225, 227. For example, if the BellSouth IM user has added CONTACT1 having an AOL IM address and a Yahoo IM address, and CONTACT 2 having only an MSN account, then presence information of CONTACT1 is determined from the AOL server 310 and the Yahoo server 312, and presence information of CONTACT2 is determined from the MSN server 314. While the polling for presence is shown as being initiated by the TPOs 221, 223, 225, 227, the polling of the various servers for presence information may also be initiated by the server or the client. Alternatively, the presence information may be continually refreshed to the various TPOs 221, 223, 225, 227 by the servers 310, 312, 314, 126 without the polling of the servers for the presence information.

In operation, the AOL TPO 221 generates an AOL-native presence query to determine whether or not CONTACT1 is present. The AOL server 310 is polled using the AOL-native presence query. The AOL server 310 receives the query and generates AOL-native presence information, which indicates whether or not CONTACT1 is present. The AOL-native presence information is relayed to the AOL TPO 221. The AOL TPO 221 encapsulates the AOL-native presence information to generate XML-structured presence information. The XML-structured presence information is relayed to the message router 175 by the AOL TPO 221. The message router 175 receives the XML-structured presence information from the AOL TPO 221, and correlates the XML-structured presence information to the AOL session object 191. Using the AOL session ID from the AOL session object 191, the message router 175 relays the XML-structured presence information to the BellSouth IM user agent 115.

Similarly, the Yahoo TPO 223 generates a Yahoo-native presence query to determine whether or not CONTACT1 is present. Likewise, the MSN TPO 225 generates an MSN-native presence query to determine whether or not CONTACT2 is present. Thus, as seen from FIG. 6, upon logging into each of the servers 310, 312, 314, 126, the respective TPOs 221, 223, 225, 227 determine the presence of the contacts. The presence information for each of the contacts is ultimately relayed back to the BellSouth user at the BellSouth IM user agent 115. In other words, the BellSouth IM user now has presence information on each of the contacts at the various servers 310, 312, 314, 126.

At this point, if CONTACT1 is present on AOL, and if the BellSouth user wishes to engage in an IM chat session with CONTACT1 through the AOL server 310, then the BellSouth user initiates an IM chat session with CONTACT1 from the BellSouth IM user agent 115. The BellSouth IM user agent 115 issues an L-structured invitation to the message router 175. The message router 175 receives the XML-structured invitation and conveys the XML-structured invitation to the AOL TPO 221. The AOL TPO 221 receives the XML-structured invitation and translates the XML-structured invitation into an AOL-native invitation. In addition to translating the XML-structured invitation, the AOL TPO 221 generates a thread ID, which is used, in one form or another, to track the thread between the BellSouth IM user agent 115 and the AOL user agent 320. The AOL TPO 221 issues the AOL-native invitation to the AOL server 310, which relays the AOL-native invitation to CONTACT1 at an AOL user agent 320 at an AOL client location. Since the AOL TPO 221 provides the AOL server 310 with information related to the thread ID, each invitation may be properly delivered to CONTACT1 at the AOL user agent 320.

If CONTACT1 at the AOL user agent 320 accepts the invitation, then the AOL user agent 320 issues an AOL-native acceptance, which is relayed to the AOL server 310. The AOL server 310 further conveys the AOL-native acceptance to the AOL TPO 221. The AOL TPO 221 receives the AOL-native acceptance and encapsulates the AOL-native acceptance to produce an XML-structured acceptance. The XML-structured acceptance is relayed to the message router 175 by the AOL TPO 221. Since the XML-structured acceptance includes information related to the thread ID for that particular IM session, the message router 175 relay the XML-structured acceptance to the proper BellSouth IM user agent 115. Upon receiving the BellSouth-native acceptance, a chat session is established between the BellSouth IM user and CONTACT1.

During the chat session, the BellSouth user agent 115 generates an XML-structured message. The BellSouth TPO 227 conveys the XML-structured message to the message router 175, which subsequently routes the XML-structured message to the AOL TPO 221 based on the message ID. The AOL TPO 221 translates the XML-structured message into an AOL-native message. In addition to routing the XML-structured message, the message router 175 may further modify the message by, for example, adding additional XML tags or tracking information, encrypting all or sensitive portions of the message, etc. Upon translating the message, the AOL TPO 221 conveys the AOL-native message to the AOL server 310. The AOL server 310 receives the AOL-native message and relays the AOL-native message to CONTACT1 at the AOL user agent 320.

Similarly, the AOL user agent 320 generates an AOL-native message. The AOL-native message is conveyed to the AOL IM server 310, which further conveys the AOL-native message to the AOL TPO 221. The AOL TPO 221 encapsulates the AOL-native message to produce an XML-structured message. In producing the XML-structured message, the AOL TPO 221 may further modify the message by, for example, modifying the message header. The AOL TPO 221 conveys the XML-structured message to the message router 175, which subsequently routes the XML-structured message to the BellSouth IM user at the BellSouth IM user agent 115.

Similar to the chat session with CONTACT1 at the AOL user agent 320, a chat session may be established with CONTACT1 at the Yahoo user agent 322 using the Yahoo TPO 223. Likewise a chat session may be established with CONTACT2 at the MSN user agent 324 using the MSN TPO 225. Since the chat sessions are established through the various TPOs 221, 223, 225, 227, each of the native servers 310, 312, 314, 126 communicate using their respective native protocols. Thus, for example, the AOL server 310 uses an AOL-native protocol; the Yahoo server 312 uses the Yahoo-native protocol, etc. In this regard, each of the TPOs 221, 223, 225, 227 appears as a native client to each of their respective servers 310, 312, 314, 126. In other words, the MSN TPO 225 appears as an MSN client to the MSN server 314; the AOL TPO 221 appears as an AOL client to the AOL server 310, etc. Thus, none of the servers 310, 312, 314, 126 modify their respective IM protocols or IM interfaces because the servers 310, 312, 314, 126 are in communication objects that behave as virtual native clients to those servers 310, 312, 314, 126.

FIGS. 7 through 12 are data flow diagrams illustrating the data flow through the system of FIGS. 1A through 4B. In the example embodiment of FIGS. 7 through 12, the BellSouth IM user has accounts on only AOL and BellSouth. However, extension of the data flow charts to other IM servers will be clear to one of ordinary skill in the art.

Figure 7:
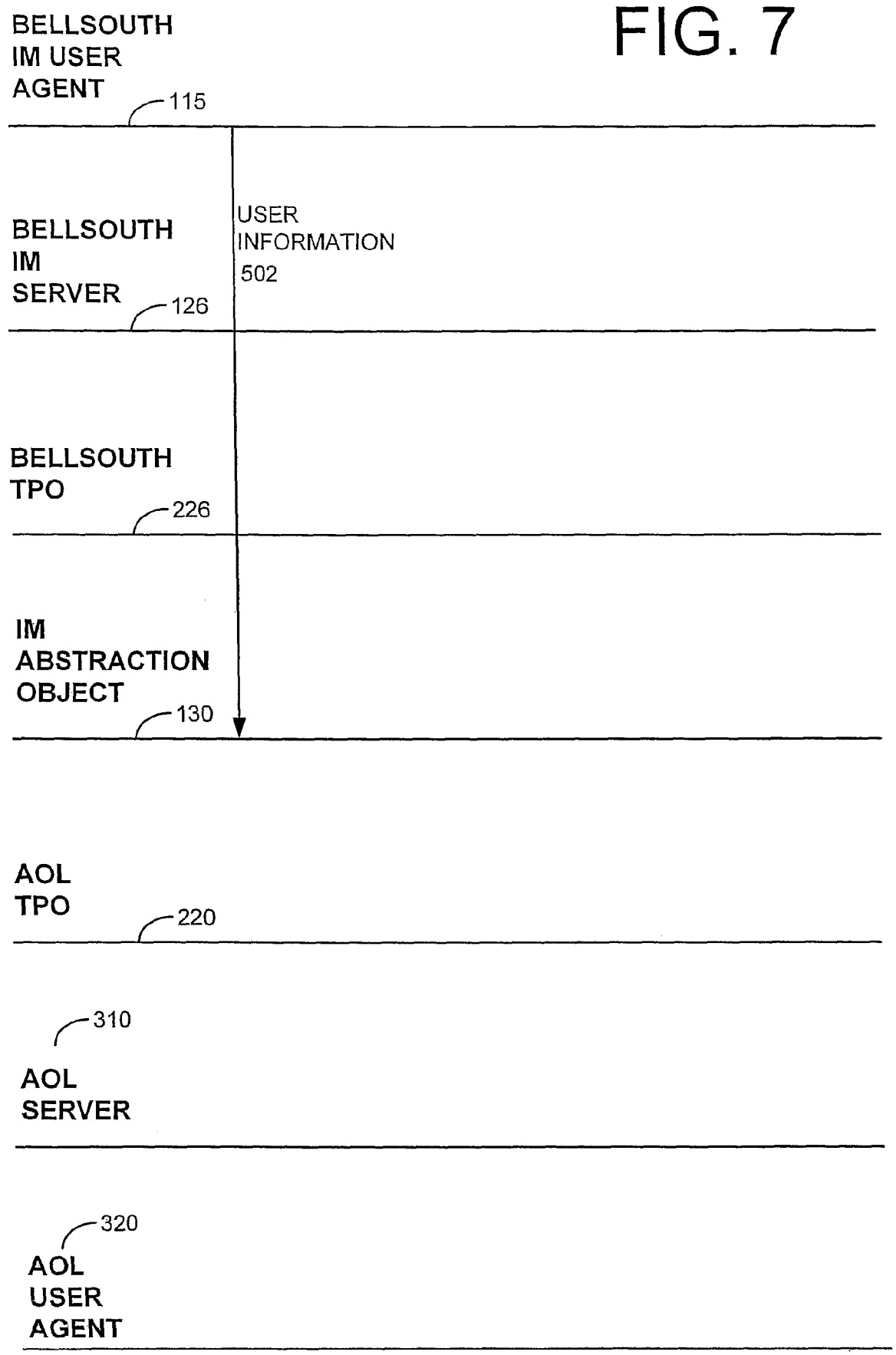

As shown in FIG. 7, a preferred embodiment of a set up process includes the BellSouth IM user agent 115 providing (502) user information to the IM abstraction object 130. In a preferred embodiment, the user information may include a user login name and password for various IM accounts. Additionally, the user information may include a list of contacts and the contacts' IM addresses. In other embodiments, contact information is not communicated during the setup process.

Figure 8:
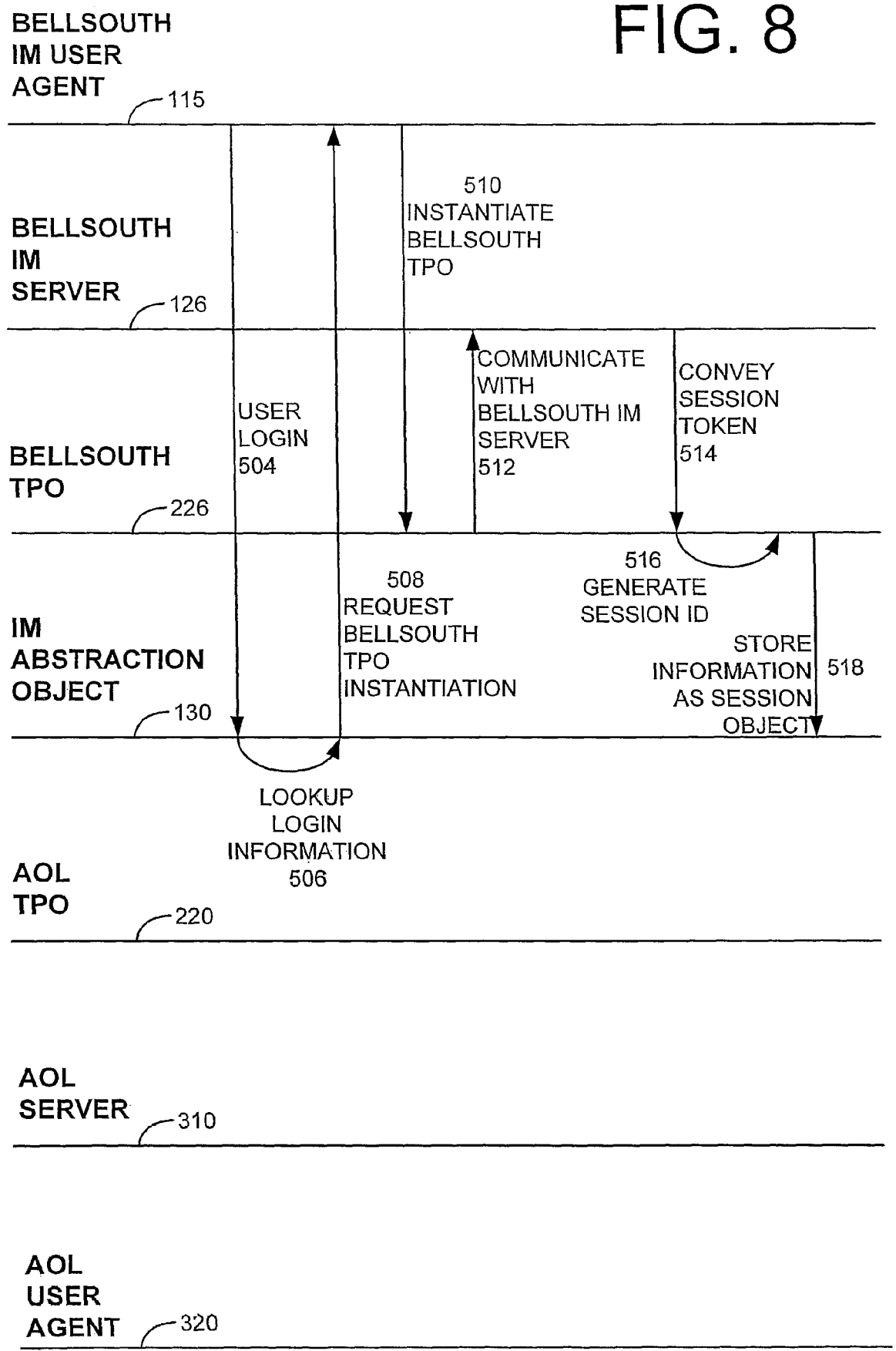

Continuing in FIG. 8, subsequent to providing (502) the setup user information to the IM abstraction object 130, the BellSouth IM user agent 115 can log in (504) to the IM abstraction object 130 by providing a user name and a password to the IM abstraction object. In response to logging in (504), the IM abstraction object 130 verifies the user name and password and looks up (506) additional login information related to the user. The IM abstraction object 130 uses the additional login information to request (508) instantiation of various TPOs by the BellSouth IM user agent 115. Since, in the example embodiment of FIGS. 7 through 12, the BellSouth IM user (not shown) has IM accounts on BellSouth and AOL, the IM abstraction object 130 requests (508) instantiation of the BellSouth TPO 226 and the AOL TPO 220. In response to the request (508), the BellSouth IM user agent 115 instantiates a BellSouth TPO 226 at the BellSouth client location 110. The BellSouth TPO 226 communicates (512) with the BellSouth IM server 126 in order to establish a session with the BellSouth IM server 126. The BellSouth IM server 126 conveys (514) tokens or other identifiers back to the BellSouth TPO 226, and the BellSouth TPO 226 generates (516) a session ID in response to the tokens or other identifiers. Session information including the session ID is then stored (518) as a BellSouth session object 196 at the IM abstraction object 130. In some embodiments, the BellSouth IM server 126 is co-located with the IM abstraction object 130, while in other embodiments, the BellSouth IM server 126 is located separately from the IM abstraction object 130.

Figure 9:
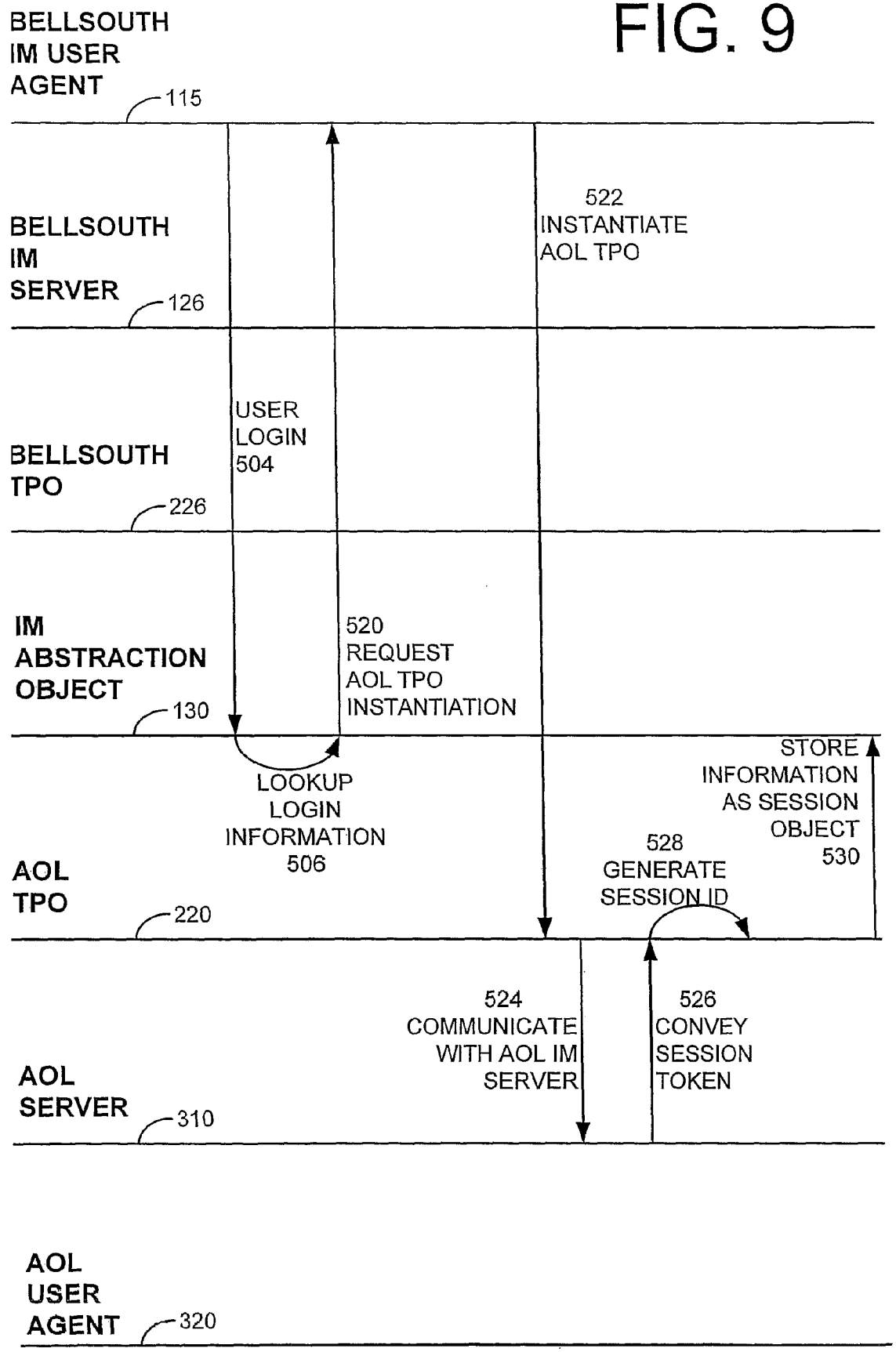

Similarly, as shown in FIG. 9, when the user logs on (504), which is the same action as the log on (504) shown in FIG. 8, re-shown here for clarity, the IM abstraction object 130 looks up (506) (again, re-shown for clarity) login information and requests (520) instantiation of an AOL TPO 220. The request (520) is conveyed to the BellSouth IM user agent 115, which instantiates (522) the AOL TPO 220 at the BellSouth client location 110. Upon instantiating (522) the AOL TPO 220, the AOL TPO 220 communicates (524) with the AOL IM server 310, which conveys (526) tokens or other identifiers back to the AOL TPO 220. The AOL TPO 220 generates (528) a session ID using the tokens or other identifiers, and stores (530) session information along with the session ID as an AOL session object 190 at the IM abstraction object 130.

As shown in FIG. 10, once the BellSouth TPO 226 and the AOL TPO 220 have been instantiated according to FIGS. 8 and 9, the AOL TPO 220 generates (532) an AOL-native login request, which is also a presence query to determine presence information of AOL contacts of the BellSouth IM user. The AOL-native login request is thus used to poll (534) the AOL server 310 for presence information. The AOL server 310 logs the user in and determines (536) presence information of the BellSouth IM user's AOL contacts, and relays (538) a login acknowledgement and the AOL-native presence information to the AOL TPO 220, often in multiple steps in some embodiments. In another embodiment, the AOL TPO 220 may not generate (532) a query. Rather, the AOL server 310 may continually update presence information and relay (538) the presence information to the AOL TPO 220 without a query for presence information. In either event, upon receiving the AOL-native login acknowledgement and presence information from the AOL server 310, the AOL TPO 220 encapsulates (540) the presence information using XML to produce XML-structured presence information for the IM abstraction object 130. The AOL TPO 220 also generates a socket ID that identifies a port through which the AOL IM session is established, which is correlated with a session ID for that connection. The XML-structured information is relayed (542) to the IM abstraction object, which uses the accompanying session ID in the XML-structured presence information. Upon determining (544) the proper session, the L-structured presence information is relayed (546) from the IM abstraction object to the BellSouth IM user agent 115. At some point, the BellSouth IM user has presence information related to all of the BellSouth IM user's AOL contacts.

Subsequently, as shown in FIG. 11, if the BellSouth IM user chooses to engage in a chat session with one of the AOL contacts, then the user inputs a session initiation at the BellSouth IM user agent 115. This BellSouth IM user agent 115 receives (548) the user input and issues (550) an XML-structured invitation for a chat session to the IM abstraction object 130. The IM abstraction object 130 relays (552) the XML-structured invitation to the AOL TPO 220. The AOL TPO 220 receives the XML-structured invitation and translates (554) the XML-structured invitation into an AOL-native invitation. In translating (554) the XML-structured invitation, the AOL TPO 220 may appropriately modify headers and other aspects of the invitation to be consonant with AOL-native protocol. The AOL-native invitation is relayed (556) by the AOL TPO 220 to the AOL server 310, which subsequently relays (557) the AOL-native invitation to the AOL user agent 320. If the invitation is accepted by the BellSouth IM user's AOL contact, then the AOL user agent 320 issues (558) an AOL-native acceptance to the AOL server 310. The AOL-native acceptance is relayed (560) from the AOL server 310 to the AOL TPO 220.

As shown in FIG. 12, upon receiving the AOL-native acceptance, the AOL TPO 220 encapsulates (562) the AOL-native acceptance using XML to produce an XML-structured acceptance. The XML-structured acceptance is relayed (563) from the AOL TPO 220 to the IM abstraction object 130, which determines (564) the chat session from information in the XML-structured acceptance. The XML-structured acceptance is then properly relayed (566) to the BellSouth IM user agent 115, at which time an IM chat session is established (568).

Once the IM chat session has been established, the BellSouth IM user agent 115 generates XML-structured chat messages, which are translated into AOL-native chat messages at the AOL TPO 220. The AOL-native chat messages are conveyed from the AOL TPO 220 to the AOL server 310, and subsequently to the AOL user agent 320 as an AOL-native chat message.

Similarly, while not specifically shown in FIGS. 7 through 12, in an alternative embodiment, the TPOs may be instantiated at the abstraction server 124 rather than at the client location 110. Thus, in the alternative embodiment, rather than requesting the BellSouth IM user agent 115 to instantiate the TPOs, the IM abstraction object 130 instantiates the TPOs at the abstraction server 124. Once the TPOs have been instantiated at the abstraction server 124, the TPOs at the abstraction server 124 provide part of the interface between the BellSouth IM user agent 115 and the various servers 310, 312, 314, 126.

The IM user agents 115, 320, 322, 324, 326, the session objects 190, 191, 192, 193, 194, 195, 196, 197, the message router 170, 175, and the TPOs 220, 221, 222, 223, 224, 225, 226, 227 of the present invention can be implemented in hardware, software, firmware, or a combination thereof. In the preferred embodiments, the IM user agents 115, 320, 322, 324, 326, the session objects 190, 191, 192, 193, 194, 195, 196, 197, the message router 170, 175, and the TPOs 220, 221, 222, 223, 224, 225, 226, 227 are implemented in software or firmware that is stored in a memory and that is executed by a suitable instruction execution system. If implemented in hardware, as in an alternative embodiment, The IM user agents 115, 320, 322, 324, 326, the session objects 190, 191, 192, 193, 194, 195, 196, 197, the message router 170, 175, and the TPOs 220, 221, 222, 223, 224, 225, 226, 227 can be implemented with any or a combination of the following technologies, which are all well known in the art: Internet Appliances, a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in the data-flow diagrams should be understood as representing modules, segments, or portions of code which include one or more executable instructions for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

The IM user agents 115, 320, 322, 324, 326, the session objects 190, 191, 192, 193, 194, 195, 196, 197, the message router 170, 175, and the TPOs 220, 221, 222, 223, 224, 225, 226, 227 may also be implemented as a computer program, which comprises an ordered listing of executable instructions for implementing logical functions. As such the computer program can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, or communicate the program for use by or in connection with the instruction execution system, apparatus, or device. The computer-readable medium can be, for example but not limited to, an electronic, magnetic, optical, electromagnetic, infrared, or semiconductor system, apparatus, or device More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could be another suitable medium upon which the program is printed, as the program can be electronically captured, via for instance optical scanning of the other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations may be made, none of which depart from the spirit of the present invention. For example, while an AOL server 310, a Yahoo server 312, an MSN server 314, and a BellSouth IM server 126 have been shown in the example embodiments, it will be clear to one of ordinary skill in the art that the systems and methods as outlined above may be extended to other Internet-based IM protocols. Also, while XML-structured information is chosen as a preferred embodiment, it will be clear to one of ordinary skill in the art that other languages or protocols may be used in place of XML, so long as those protocols provide for broad Internet applications. Additionally, while the IM abstraction object 130 is located on the abstraction server 124 in the various embodiments, it will be clear to one of ordinary skill in the art that the IM abstraction object 130 may be located at a client location, rather than at a server. Also, while IM has specifically been described in detail in FIGS. 1A through 12, it will be clear to one of ordinary skill in the art that the IM implementation may easily be extended to other messaging techniques such as email, voice-over Internet protocol (VoIP), video-conferencing, etc. Thus, the IM abstraction object 130 and the TPOs 220, 221, 222, 223, 224, 225, 226, 227 may be implemented outside of the IM context. In other words, the architecture of the IM abstraction object 130 and the TPOs 220, 221, 222, 223, 224, 225, 226, 227 is independent of the type of messaging technology, and may be adapted to translate native protocols for various messaging technologies into a universal language, thereby providing a user with similar options as those discussed herein. Also, while the BellSouth client location 110 is shown with only a BellSouth IM user agent 115, it will be clear to one of ordinary skill in the art that the BellSouth client location 110 may include other conventional components. Additionally, while the BellSouth IM user agent 115 is described above as pre-existing at the BellSouth client location 110, it will be clear to one of ordinary skill in the art that the BellSouth IM user agent 115 may be downloaded from a website and installed at the BellSouth client location 110 or, alternatively, installed at the BellSouth client location 110 using other conventional techniques. Also, while specific servers are shown in the various embodiments, it will be clear to one of ordinary art that these specific servers are foreign servers in that the servers do not use XML as their native protocol. All such changes, modifications, and alterations should therefore be seen as within the scope of the present invention.

What is claimed is:

1. In a communication system, a method comprising:
    instantiating a plurality of transport protocol objects (TPOs) at a server, each of the plurality of TPOs adapted to provide a translation between a first instant messaging (IM) protocol and one of a plurality of different IM protocols and to provide a translation of an invitation for an IM session received from a user;
    establishing a plurality of connections between the plurality of TPOs and a plurality of IM servers, each of the plurality of IM servers adapted to transmit and receive IM messages using one of the different IM protocols; and
    providing a communication pathway between a plurality of IM user agents and the plurality of IM servers through the plurality of instantiated TPOs, the plurality of IM user agents adapted to transmit and receive IM messages using the first IM protocol,
    wherein the instantiating the plurality of TPOs comprises:
    receiving a single login name and password;
    correlating the single login name and password to a plurality of login names and passwords, each of the plurality of login names and passwords associated with one of a plurality of IM accounts, each of the plurality of IM accounts on one of a plurality of IM servers, each of the plurality of IM servers adapted to transmit and receive IM messages using one of the plurality of different IM protocols;
    retrieving information related to each of the different IM protocols; and
    conveying the retrieved information and the plurality of login names and passwords to one of the plurality of IM user agents.

2. The method of claim 1, wherein the providing the communication pathway comprises:
    receiving a message from one of the plurality of IM user agents, the message received using the first IM protocol;
    translating the message from the first IM protocol to one of the different IM protocols; and
    conveying the translated message to one of the plurality of IM servers, the one of the plurality of IM servers adapted to transmit and receive IM messages using the one of the different IM protocols.

3. The method of claim 2, wherein the translating the message from the first IM protocol to one of the different IM protocols comprises:
    translating an Extensible Markup Language (XML) structured message into a non-XML-structured message.

4. The method of claim 3, wherein the translating the XML-structured message into the non-XML-structured message comprises:
    translating XML-structured presence information into non-XML-structured presence information.

5. The method of claim 3, wherein the translating the XML-structured message into the non-XML-structured message comprises:
    translating an XML-structured text message into non-XML-structured text message.

6. The method of claim 1, wherein the providing the communication pathway comprises:
    receiving a message from the one of the plurality of IM servers, the one of the plurality of IM servers adapted to transmit and receive IM messages using one of the plurality of different IM protocols;
    translating the message from one of the plurality of different IM protocols to a first IM protocol; and
    conveying the translated message to one of the plurality of IM user agents.

7. The method of claim 6, wherein the translating the message from one of the plurality of different IM protocols the first IM protocol comprises:
    translating a non-Extensible Markup Language (XML) structured message into an XML-structured message.

8. The method of claim 7, wherein the translating the non-XML-structured message into the XML-structured message comprises:
    translating non-XML-structured presence information into XML-structured presence information.

9. The method of claim 7, wherein the translating the non-XML-structured message into the XML-structured message comprises:
 translating a non-XML-structured text message into an XML-structured text message.

10. The method of claim 1, wherein the instantiating the plurality of TPOs further comprises:
 receiving the information related to each of the different IM protocols; and
 instantiating a plurality of TPOs, each of the plurality of TPOs associated with each of the different IM protocols.

11. A communication system comprising:
 means for instantiating a plurality of transport protocol objects (TPOs) at a server, each of the plurality of TPOs adapted to provide a translation between a first instant messaging (M) protocol and one of a plurality of different IM protocols and to provide a translation of an invitation for an IM session received from a user;
 means for establishing a plurality of connections between the plurality of TPOs and a plurality of IM servers, each of the plurality of IM servers adapted to transmit and receive IM messages using one of the different IM protocols; and
 means for providing a communication pathway between a plurality of IM user agents and the plurality of IM servers through the plurality of instantiated TPOs, each of the plurality of IM user agents adapted to transmit and receive IM messages using the first IM protocol,
 wherein the means for instantiating the plurality of TPOs comprises:
 means for receiving a single login name and password;
 means for correlating the single login name and password to a plurality of login names and passwords, each of the plurality of login names and passwords associated with one of a plurality of IM accounts, each of the plurality of IM accounts on one of a plurality of IM servers each of the plurality of IM servers adapted to transmit and receive IM messages using one of the plurality of different IM protocols;
 means for retrieving information related to each of the different IM protocols; and
 means for conveying the retrieved information and the plurality of login names and passwords to one of the plurality of IM user agents.

12. A non-transitory computer-readable medium comprising:
 computer-readable code adapted to instruct a programmable device to instantiate a plurality of transport protocol objects (TPOs) at a server, each of the plurality of TPOs adapted to provide a translation between a first instant messaging (IM) protocol and one of a plurality of different IM protocols and to provide a translation of an invitation for an IM session received from a user;
 computer-readable code adapted to instruct a programmable device to establish a plurality of connections between the plurality of TPOs and a plurality of IM servers, each of the plurality of IM servers adapted to transmit and receive IM messages using one of the different IM protocols; and
 computer-readable code adapted to instruct a programmable device to provide a communication pathway between a plurality of IM user agents and the plurality of IM servers through the plurality of instantiated TPOs, the plurality of IM user agents adapted to transmit and receive IM messages using the first IM protocol,
 wherein the instantiating the plurality of TPOs comprises instructing a programmable device to:
 receive a single login name and password;
 correlate the single login name and password to a plurality of login names and passwords, each of the plurality of login names and passwords associated with one of a plurality of IM accounts, each of the plurality of IM accounts on one of a plurality of IM servers, each of the plurality of IM servers adapted to transmit and receive IM messages using one of the plurality of different IM protocols;
 retrieve information related to each of the different IM protocols; and
 convey the retrieved information and the plurality of login names and passwords to one of the plurality of IM user agents.

13. A non-transitory computer readable medium having stored thereon computer executable instructions for a server-based message protocol translation, the computer executable instructions defining steps comprising:
 instantiating a plurality of transport protocol objects (TPOs) at a TPO server, each of the plurality of TPOs adapted to provide a translation between a first instant messaging (IM) protocol and one of a plurality of different IM protocols;
 establishing a plurality of connections between the plurality of TPOs and a plurality of IM servers, each of the plurality of IM servers adapted to transmit and receive IM messages using one of the different IM protocols;
 providing a communication pathway between a plurality of IM users agents and the plurality of IM servers through the plurality of instantiated TPOs, the plurality of IM user agents adapted to transmit and receive IM messages using the first IM protocol;
 generating a session identification (session ID) associated with at least one of the IM protocols;
 retrieving contact information for at least one contact from at least on of the IM servers; and
 organizing the retrieved contact information according to the IM server from which the contact information was retrieved,
 wherein the establishing the plurality of connections between the plurality of TPOs and the plurality of IM servers further comprises computer executable instructions defining steps comprising:
 receiving a plurality of login names and passwords, each of the plurality of login names and passwords associated with one of a plurality of IM accounts, each of the plurality of IM accounts located on one of the plurality of IM servers, each of the plurality of IM servers adapted to transmit and receive IM messages using a different IM protocol; and
 establishing an IM session at each of the plurality of IM accounts using the received plurality of login names and passwords.

14. In a communication system, a method comprising:
 instantiating a plurality of transport protocol objects (TPOs) at a server, each of the plurality of TPOs adapted to provide a translation between a first instant messaging (IM) protocol and one of a plurality of different IM protocols and to provide a translation of an invitation for an IM session received from a user;
 establishing a plurality of connections between the plurality of TPOs and a plurality of IM servers, each of the plurality of servers adapted to transmit and receive IM messages using one of the different IM protocols; and
 providing a communication pathway between a plurality of IM user agents and the plurality of IM servers through the plurality of instantiated TPOs, the plurality of IM user agents adapted to transmit and receive IM messages using the first IM protocol, wherein the establishing the plurality of connections between the plurality of TPOs and the plurality of IM servers comprises:

receiving a plurality of login names and passwords, each of the plurality of login names and passwords associated with one of a plurality of IM accounts, each of the plurality of IM accounts located on one of the plurality of IM servers, each of the plurality of IM servers adapted to transmit and receive IM messages using a different IM protocol; and establishing an IM session at each of the plurality of IM accounts using the received plurality of login names and passwords.

15. The method of claim 14, wherein the establishing the IM session comprises:

receiving information from each of the plurality of IM servers; and generating a session ID associated with each of the plurality of IM servers in response to receiving information.

16. The method of claim 15, further comprising:

storing session information having the generated session ID.

* * * * *